(12) United States Patent
Lin

(10) Patent No.: US 7,742,243 B2
(45) Date of Patent: Jun. 22, 2010

(54) PROJECTION LENS WITH HIGH RESOLUTION AND REDUCED OVERALL LENGTH

(75) Inventor: Chun-Ling Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 105 days.

(21) Appl. No.: 11/952,974

(22) Filed: Dec. 7, 2007

(65) Prior Publication Data

US 2009/0052055 A1      Feb. 26, 2009

(30) Foreign Application Priority Data

Aug. 24, 2007 (CN) .................. 2007 1 0201467

(51) Int. Cl.
  *G02B 9/04*        (2006.01)
(52) U.S. Cl. .................. 359/793; 359/717; 359/749

(58) Field of Classification Search .................. 359/708, 359/717, 749–756, 761, 763, 770, 771, 781–784, 359/793; 348/240.99–240.3, 335–369; 396/72–88
See application file for complete search history.

(56) References Cited

U.S. PATENT DOCUMENTS

| | | | | |
|---|---|---|---|---|
| 5,731,912 | A * | 3/1998 | Abe | 359/691 |
| 5,999,337 | A * | 12/1999 | Ozaki | 359/793 |
| 6,147,812 | A | 11/2000 | Narimatsu et al. | |
| 2003/0090815 | A1* | 5/2003 | Chang | 359/749 |
| 2007/0058267 | A1 | 3/2007 | Kawana | |

* cited by examiner

*Primary Examiner*—Darryl J Collins
(74) *Attorney, Agent, or Firm*—Zhigang Ma

(57) ABSTRACT

An exemplary projection lens includes, in this order from the magnification side to the minification side thereof, a negative lens group of negative fraction power, and a positive lens group of positive fraction power. The projection lens satisfies the formulas of: $-2.5<F1/F<-1.5$; and $1.3<F2/F<1.5$, where $F1$, $F2$, and $F$ respectively represent the effective focal lengths of the negative lens group, the positive lens group, and the projection lens.

17 Claims, 10 Drawing Sheets

PROJECTION LENS WITH HIGH RESOLUTION AND REDUCED OVERALL LENGTH

BACKGROUND

1. Technical Field

The invention relates to projection lens and, particularly, relates to a projection lens having a high resolution and a small overall length.

2. Description of Related Art

In order to obtain a sharp projection image and reduce a size of projectors, such as digital light processing (DLP) projectors, liquid crystal display (LCD) projectors, or liquid crystal on silicon (LCoS) projectors, projection lenses with high resolution but short overall length (the distance between the magnification-side surface of such a projection lens and a surface of a spatial light modulator (SLM), e.g., digital micromirror device (DMD), LCD panel, or LCoS panel, equipped in a projector facing the projection lens) are needed. Factors affecting both the resolution and the overall length of the projection lens, such as the number and position of lenses employed, the refraction power distributions of the employed lenses, and the shape of each of the employed lenses, complicate any attempt at increasing resolution and shortening overall length of projection lenses. For example, reducing the number of lenses can shorten the overall length of the projection lens, but resolution will suffer, conversely, increasing the number of lenses can increase resolution, but increases overall length of the projection lens.

Therefore, it is desirable to provide a projection lens which can overcome the abovementioned problems.

SUMMARY

In a present embodiment, a projection lens includes, in this order from the magnification side to the minification side thereof, a negative lens group having negative fraction of power, and a positive lens group having positive fraction of power. The projection lens satisfies the formulas of: $-2.5 < F1/F < -1.5$; and $1.3 < F2/F < 1.5$, where F1, F2, and F respectively represent the effective focal lengths of the negative lens group, the positive lens group, and the projection lens.

BRIEF DESCRIPTION OF THE DRAWINGS

Many aspects of the present projection lens should be better understood with reference to the following drawings. The components in the drawings are not necessarily drawn to scale, the emphasis instead being placed upon clearly illustrating the principles of the present projection lens. Moreover, in the drawings, like reference numerals designate corresponding parts throughout the several views.

DETAILED DESCRIPTION OF THE EMBODIMENTS

Embodiments of the present projection lens will now be described in detail with reference to the drawings.

Figure 1:
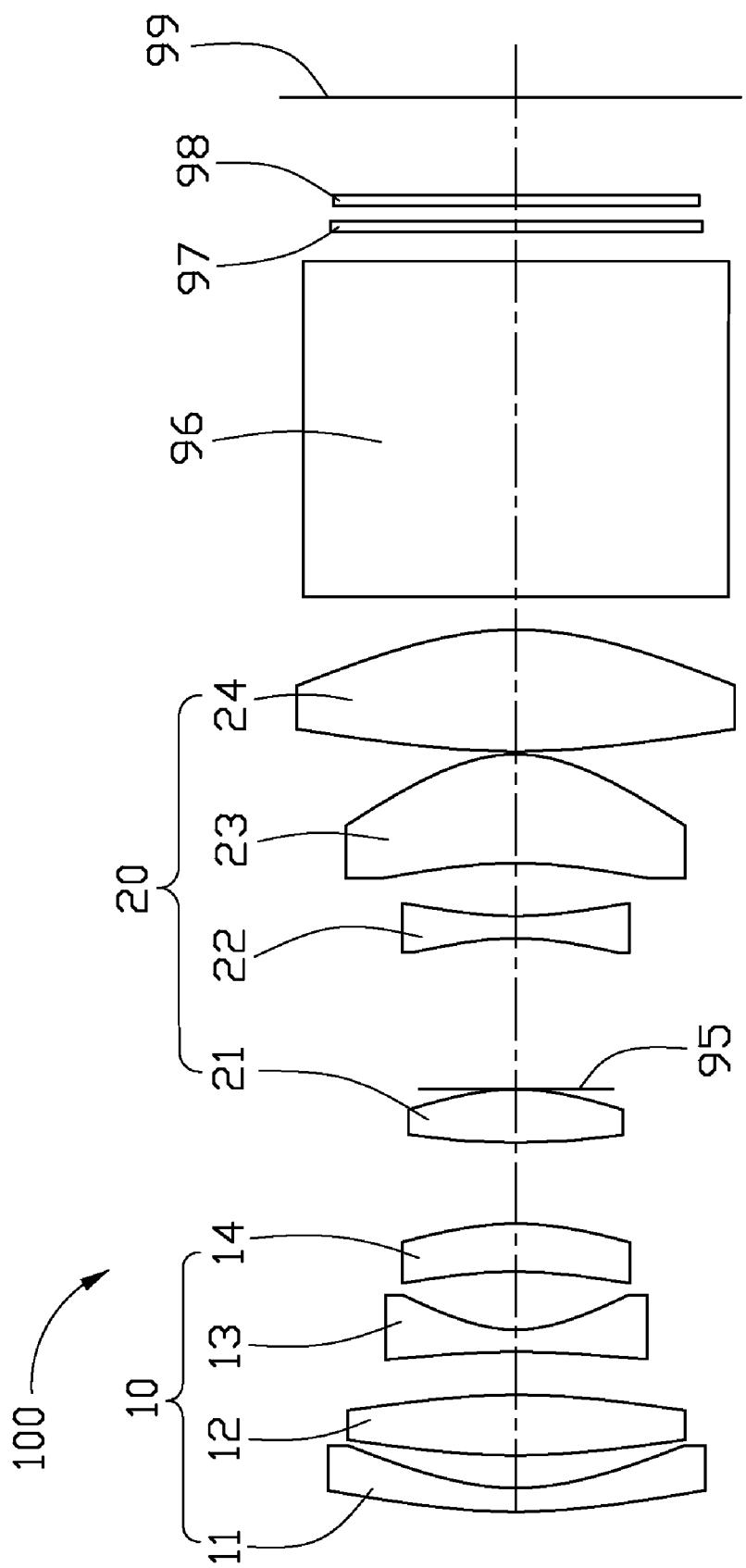
FIG. 1 is a schematic view of a projection lens in accordance with an embodiment.

Referring to FIG. 1, the projection lens 100, according to an exemplary embodiment, is opportunely used in LCoS projectors. Such an LCoS projector commonly equips with an LCoS panel (not shown) that has a surface 99 facing the projection lens 100. The projection lens 100 includes, in this order from the magnification side to the minification side thereof, a negative lens group 10, and a positive lens group 20. The negative lens group 10 has a negative refraction of power, while the positive lens group 20 has a positive refraction of power. The projection lens 100 satisfies the formulas of: (1) $-2.5 < F1/F < -1.5$; and (2) $1.3 < F2/F < 1.5$. Where F1, F2, and F respectively represent the effective focal lengths of the negative lens group 10, the positive lens group 20, and the projection lens 100.

The formulas (1), (2) are adapted for distributing the fraction power of the lens groups 10, 20, to limit the overall length of the projection lens 100, and control/correct aberrations occurring in the projection lens 100 within an acceptable level. As for formula (1), $F1/F > -2.5$ is configured to limit the overall length of the projection lens 100, plus widen the field angle of the projection lens 100; $F1/F < -1.5$ is adapted to control aberrations, especially distortion, caused by the negative lens group 10. Formula (2) is adapted to efficiently correct aberrations caused by the negative lens group 10, and to obtain a telecentric projection lens 100 with short overall length. Specifically, if $F2/F > 1.3$ is not satisfied, aberrations may be insufficiently corrected, and the projection lens 100 may lose the telecentric characteristic, conversely, if $F2/F < 1.5$ is not satisfied, aberrations may be over corrected, and attempt at shortening the overall length of the projection lens 100 may fail.

Also, the projection lens 100 satisfies the formula: (3) $Lb/F > 1.6$, where Lb is the rear focal length of the projection lens 100 (the distance between the minifcation-side surface of the projection lens 100 and the surface 99). This formula is for increasing the rear focal length Lb to provide sufficient space to accommodate an arrangement of a polarizer 98, a half-wave plate 97, and a polarization beam splitter (PBS) prism 96 of the LCoS projector.

Opportunely, the projection lens 100 also satisfies the formula: (4) $0.24 < D12/F < 0.5$, where D12 is the distance between the lens groups 10, 20 on the optical axis of the projection lens 100. In detail, $D12/F < 0.5$ is for controlling the overall length of the projection lens 100, and $D12/F > 0.24$ is to provide sufficient space to allow focus adjustment of the projection lens 100.

Specifically, the negative lens group 10 includes, in this order from the magnification side to the minification side of the projection lens 100, a first lens 11 of negative refraction power, a second lens 12 of positive refraction power, a third lens 13 of negative refraction power, and a fourth lens 14 of positive refraction power. In order to efficiently control aberrations caused by the negative lens group 10, at least one of the four lenses 11~14 has at least one aspherical surface (i.e., aspherical lens), whereas, in order to reduce cost of the projection lens 100, spherical lenses are preferably used in the projection lens 100. Therefore, the negative lens group 10 of this embodiment includes only one aspherical lens, e.g., aspherical first lens 11 or second lens 12, to balance the controlling of aberrations and contribute to the reduction of cost.

The positive lens group 20 includes, in this order from the magnification side to the minification side of the projection lens 100, a fifth lens 21 of positive refraction power, a sixth lens 22 of negative refraction power, a seventh lens 23 of positive refraction power, and a eighth lens 24 of positive refraction power. For similar reasons as above, the positive lens group 20 includes only one aspherical lens, e.g., aspherical seventh lens 23.

More specifically, the projection lens 100 further includes an aperture stop 95. The aperture stop 95 is interposed between the fifth lens 21 and the sixth lens 22 so as to block off-axis light rays from the sixth lens 22 entering the fifth lens 21, and thereby prevents too much distortion occurring in the projection lens 100 (the off-axis light rays are the main cause of distortion).

In order to control chromatic aberration occurring in the projection lens 100, at least one of the lenses 11~14 of the negative lens group 10 satisfies the formula: (5) V1>55, and n1>1.5, where V1, n1 respectively represent the Abbe number and the refractive index of the at least one of the lenses 11~14. In addition, at least one of the lenses 21~24 of the positive lens group 20 satisfies the formula: (6) V2>60, where V2 is the Abbe number of the at least one of the lenses 21~24.

Opportunely and specifically, except the aspherical lenses, e.g., aspherical lens 11, 12, or 23, the lenses of the projection lens 100 is advantageously a spherical glass lens to reduce cost of the projection lens 100 and control chromatic aberration occurring in the projection lens 100. As for the aspherical lenses, each of their surfaces is shaped according to the formula:

$$x = \frac{ch^2}{1 + \sqrt{1 - (k+1)c^2h^2}} + \sum A_i h^i,$$

where h is a height from the optical axis of the projection lens 100 to the aspherical surface, c is a vertex curvature, k is a conic constant, and Ai are i-th order correction coefficients of the aspheric surfaces.

Detailed examples of the projection lens 100 are given below in company with FIGS. 2-10, but it should be noted that the projection lens is not limited to these examples. Listed below are the symbols used in these detailed examples:

$F_{No}$: F number;
2ω: field angle;
R: radius of curvature;
d: distance between surfaces on the optical axis of the projection lens 100;
Nd: refractive index of lens; and
V: Abbe constant.

When projecting an image, the image is modulated by the LCoS panel, and projects from the surface 99, transmits through the polarizer 98, the half-wave plate 97, the PBS prism 96, the projection lens 100, and finally projects onto a screen (not shown).

EXAMPLE 1

Tables 1, 2 show the lens data of Example 1, wherein F=21.58 mm, F1=−38.85 mm, F2=30.425 mm, $F_{No}$=2.45; 2ω=57.4°, and the second lens 12 and the seventh lens 23 is aspherical lens.

TABLE 1

| Surface | R (mm) | d (mm) | Nd | V |
|---|---|---|---|---|
| Magnification-side surface of the first lens 11 | 56.088 | 1.5 | 1.589 | 61.135 |
| Minification-side surface of the first lens 11 | 23.041 | 2.111 | — | — |
| Magnification-side surface of the second lens 12 | 66.179 | 4.045 | 1.6073 | 26.65 |
| Minification-side surface of the second lens 12 | −39.229 | 2.771 | — | — |
| Magnification-side surface of the third lens 13 | −79.672 | 1.5 | 1.571 | 50.8 |

TABLE 1-continued

| Surface | R (mm) | d (mm) | Nd | V |
|---|---|---|---|---|
| Minification-side surface of the third lens 13 | 13.178 | 3.771 | — | — |
| Magnification-side surface of the fourth lens 14 | −35.77 | 3.156 | 1.744 | 44.786 |
| Minification-side surface of the fourth lens 14 | −24.669 | 5.28 | — | — |
| Magnification-side surface of the fifth lens 21 | 43.254 | 3.481 | 1.589 | 61.135 |
| Minification-side surface of the fifth lens 21 | −19.618 | 0.15 | — | — |
| Surface of aperture stop 95 | infinite | 9.834 | — | — |
| Magnification-side surface of the sixth lens 22 | −25.202 | 1.5 | 1.8467 | 23.78 |
| Minification-side surface of the sixth lens 22 | 32.223 | 3.46 | — | — |
| Magnification-side surface of the seventh lens 23 | −49.8 | 7.1 | 1.5247 | 56.26 |
| Minification-side surface of the seventh lens 23 | −16.129 | 0.246 | — | — |
| Magnification-side surface of the eighth lens 24 | 72.513 | 7.946 | 1.6968 | 55.53 |
| Minification-side surface of the eighth lens 24 | −29.765 | 2.15 | — | — |
| Magnification-side surface of the PBS prism 96 | infinite | 22 | 1.6477 | 33.848 |
| Minification-side surface of the PBS prism 96 | infinite | 2 | — | — |
| Magnification-side surface of the half-wave plate 97 | infinite | 0.7 | 1.5184 | 61.7 |
| Minification-side surface of the half-wave plate 97 | infinite | 1 | — | — |
| Magnification-side surface of the polarizer 98 | infinite | 0.7 | 1.523 | 58.57 |
| Minification-side surface of the polarizer 98 | infinite | 8 | — | — |
| The surface 99 | infinite | — | — | — |

TABLE 2

| Surface | Aspherical coefficient |
|---|---|
| Magnification-side surface of the second lens 12 | k = −10.97392; A4 = 1.82963E−5; A6 = −9.26848E−8; A8 = 5.59189E−10; A10 = −1.98742E−12 |
| Minification-side surface of the second lens 12 | k = −22.43766; A4 = 3.49E−6; A6 = 2.72E−8; A8 = 7.02E−11; A10 = −7.80E−13 |
| Magnification-side surface of the seventh lens 23 | k = −79.16789; A4 = −1.08162E−4; A6 = 9.00E−07; A8 = −9.89E−9; A10 = 3.47E−11 |
| Minification-side surface of the seventh lens 23 | k = 0.4065924; A4 = 1.07E−5; A6 = 8.96E−9; A8 = 2.79E−10; A10 = −2.67E−12 |

Figure 2:
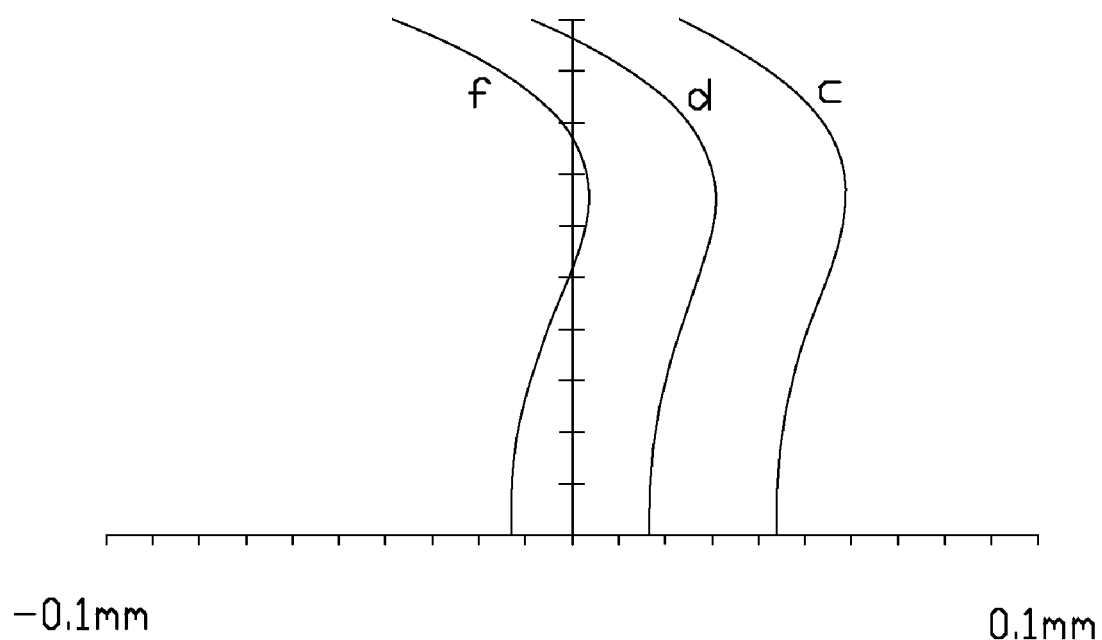
FIG. 2-4 are graphs respectively showing spherical aberration, field curvature, and distortion occurring in the projection lens in accordance with a first exemplary embodiment.
Figure 3:
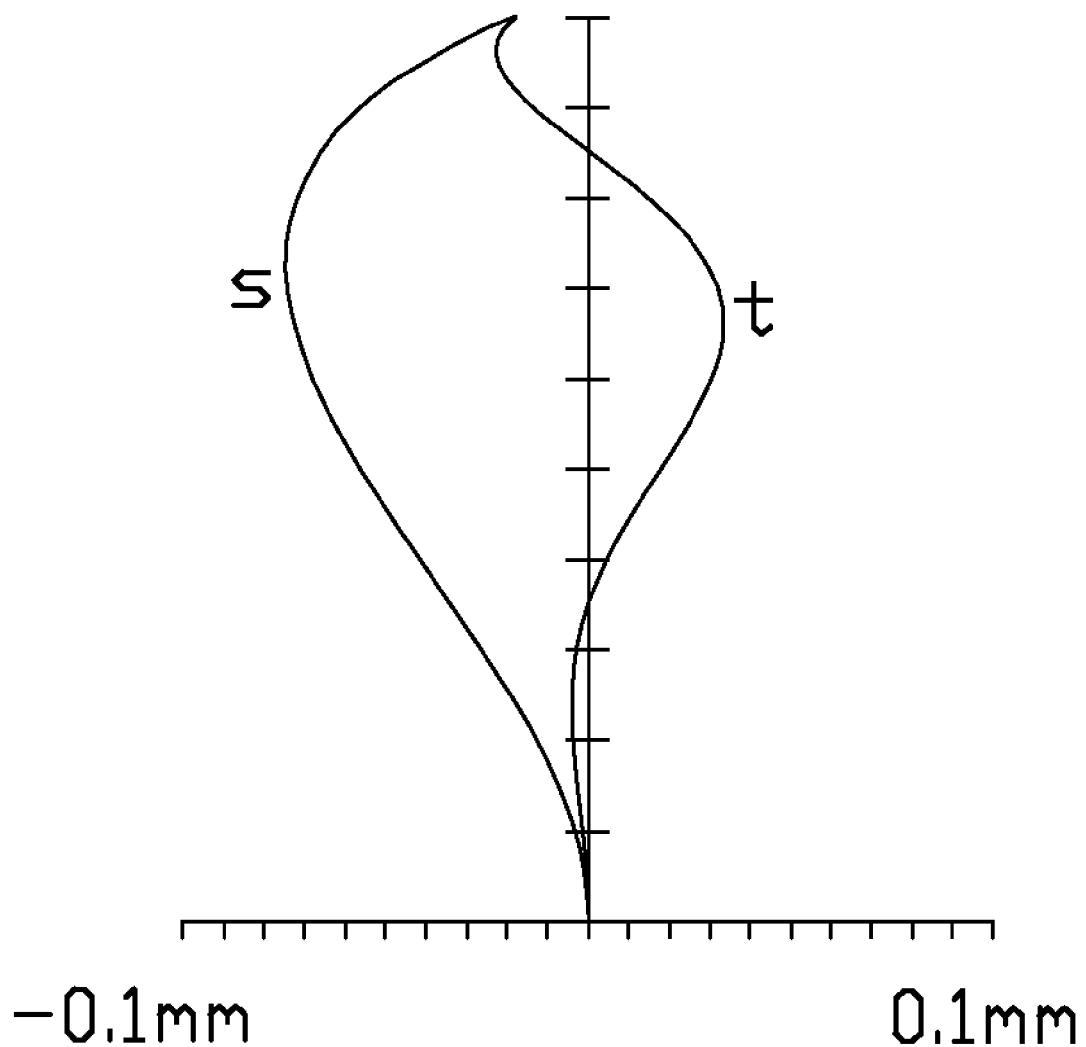
Figure 4:
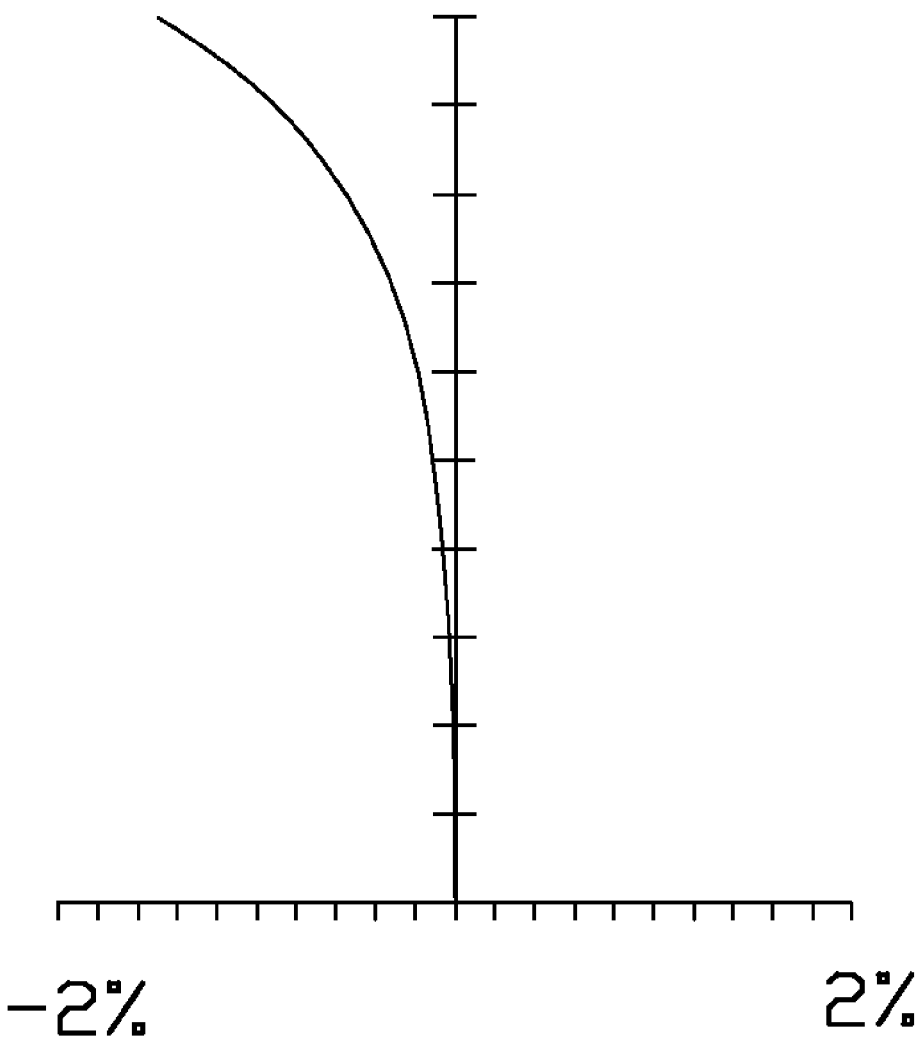

As illustrated in FIG. 2, the curves f, d, and c are respective spherical aberration characteristic curves of f light (wavelength: 486.1 nm), d light (587.6 nm), and c light (656.3 nm) occurring in the projection lens 100 of Example 1. Obviously, spherical aberration occurring in projection lens 100 of Example 1 is in a range of: −0.1 mm~0.1 mm. In FIG. 3, the curves t and s are the tangential field curvature curve and the sagittal field curvature curve respectively. Clearly, field curvature occurring in the projection lens 100 of Example 1 is limited to a range of: −0.1 mm~0.1 mm. In FIG. 4, distortion occurring in the projection lens 100 of Example 1 is limited to be within the range of: −2%~2%.

EXAMPLE 2

Tables 3, 4 show the lens data of EXAMPLE 2, wherein F=20.57 mm, F1=−43.378 mm, F2=29.585 mm, $F_{No}$=2.44; 2ω=56.98°, and the second lens 12 and the seventh lens 23 is aspherical lens.

TABLE 3

| Surface | R (mm) | d (mm) | Nd | V |
|---|---|---|---|---|
| Magnification-side surface of the first lens 11 | 56.37951 | 1.5 | 1.5163 | 64.142 |
| Minification-side surface of the first lens 11 | 19.45174 | 2.784273 | — | — |
| Magnification-side surface of the second lens 12 | 67.52031 | 4.063589 | 1.6073 | 26.65 |
| Minification-side surface of the second lens 12 | −35.39937 | 1.838138 | — | — |
| Magnification-side surface of the third lens 13 | −115.634 | 1.5 | 1.5225 | 59.8354 |
| Minification-side surface of the third lens 13 | 12.79318 | 4.061006 | — | — |
| Magnification-side surface of the fourth lens 14 | −33.31014 | 3.632139 | 1.6204 | 60.2896 |
| Minification-side surface of the fourth lens 14 | −22.97251 | 5.274921 | — | — |
| Magnification-side surface of the fifth lens 21 | 47.65653 | 3.315928 | 1.589 | 61.135 |
| Minification-side surface of the fifth lens 21 | −19.51972 | 0.15 | — | — |
| Surface of aperture stop 95 | infinite | 8.758488 | — | — |
| Magnification-side surface of the sixth lens 22 | −24.89886 | 1.5 | 1.8467 | 23.78 |
| Minification-side surface of the sixth lens 22 | 30.70857 | 3.418172 | — | — |
| Magnification-side surface of the seventh lens 23 | −50.35514 | 7.1 | 1.5247 | 56.26 |
| Minification-side surface of the seventh lens 23 | −15.63497 | 1.041066 | — | — |
| Magnification-side surface of the eighth lens 24 | 84.05907 | 7.926621 | 1.6968 | 55.53 |
| Minification-side surface of the eighth lens 24 | −28.60263 | 2.135659 | — | — |
| Magnification-side surface of the PBS prism 96 | infinite | 22 | 1.6477 | 33.848 |
| Minification-side surface of the PBS prism 96 | infinite | 2 | — | — |
| Magnification-side surface of the half-wave plate 97 | infinite | 0.7 | 1.5184 | 61.7 |
| Minification-side surface of the half-wave plate 97 | infinite | 1 | — | — |
| Magnification-side surface of the polarizer 98 | infinite | 0.7 | 1.523 | 58.57 |
| Minification-side surface of the polarizer 98 | infinite | 8 | — | — |
| The surface 99 | infinite | — | — | — |

TABLE 4

| Surface | Aspherical coefficient |
|---|---|
| Magnification-side surface of the second lens 12 | k = −10.17326; A4 = 1.74E−5; A6 = −1.02E−7; A8 = 6.22E−10; A10 = −2.15E−12 |
| Minification-side surface of the second lens 12 | k = −19.16988; A4 = 1.81E−6; A6 = 3.9E−8; A8 = 3.7E−11; A10 = −6.46E−13 |
| Magnification-side surface of the seventh lens 23 | k = −91.33926; A4 = −1.21802E−4; A6 = 1.14E−6; A8 = −1.34E−8; A10 = 5.7E−11 |
| Minification-side surface of the seventh lens 23 | k = 0.3093345; A4 = 8.74E−6; A6 = −4.76E−9; A8 = 3.04E−10; A10 = −3.85E−12 |

Figure 5:
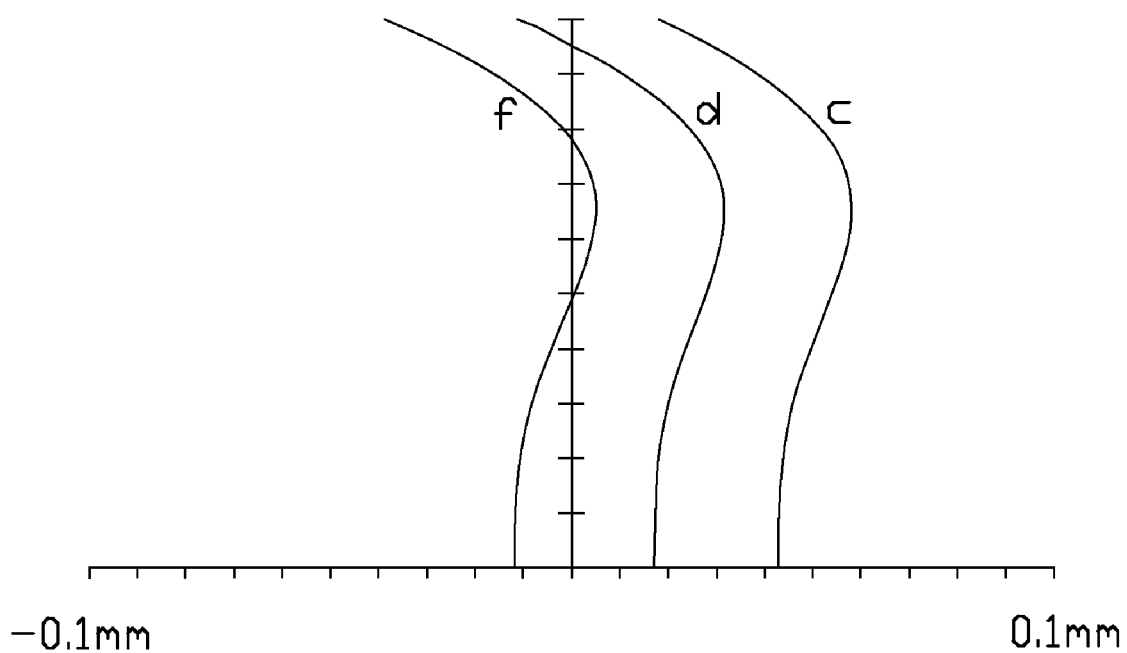
FIG. 5-7 are graphs respectively showing spherical aberration, field curvature, and distortion occurring in the projection lens in accordance with a second exemplary embodiment.
Figure 6:
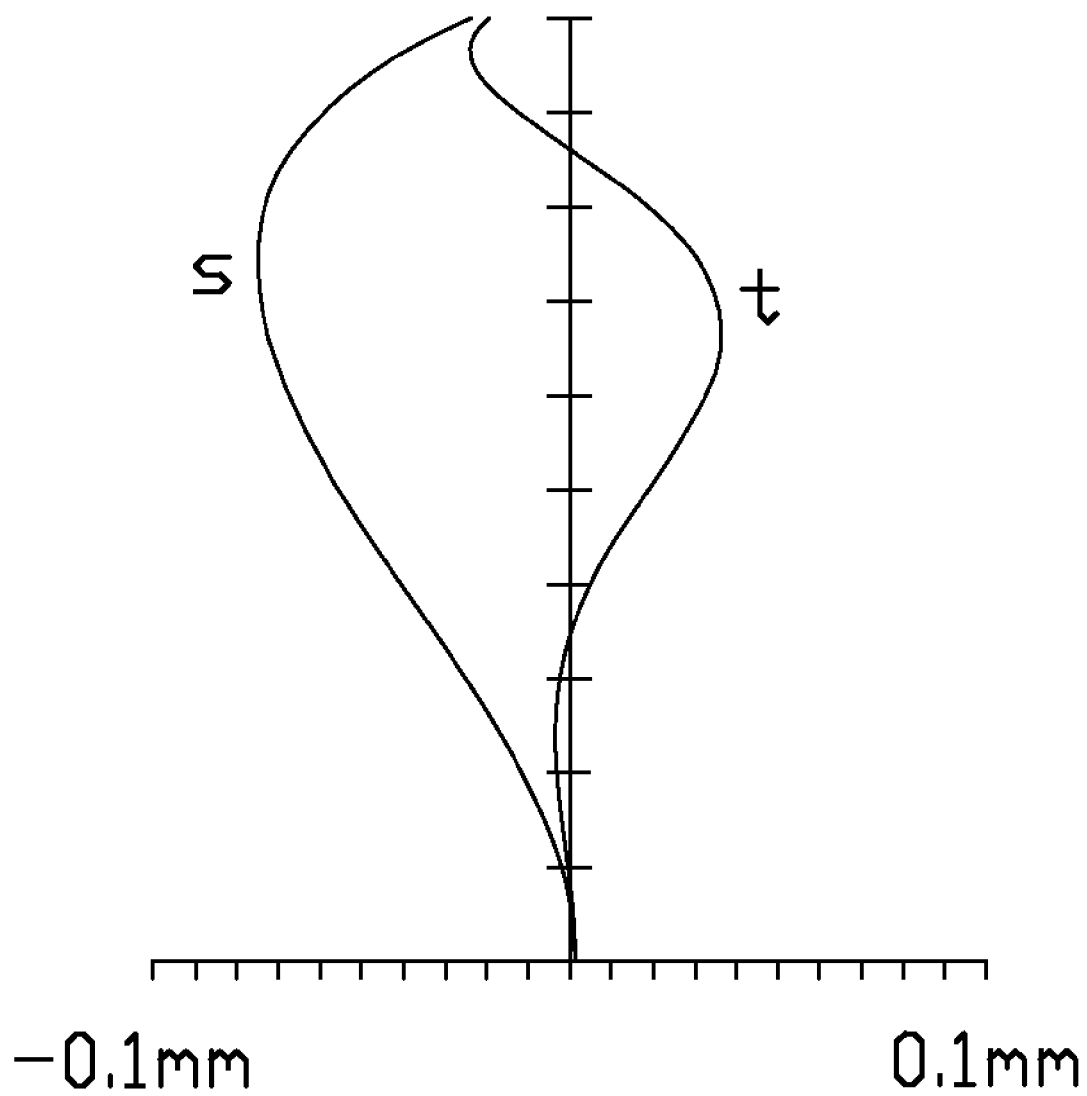
Figure 7:
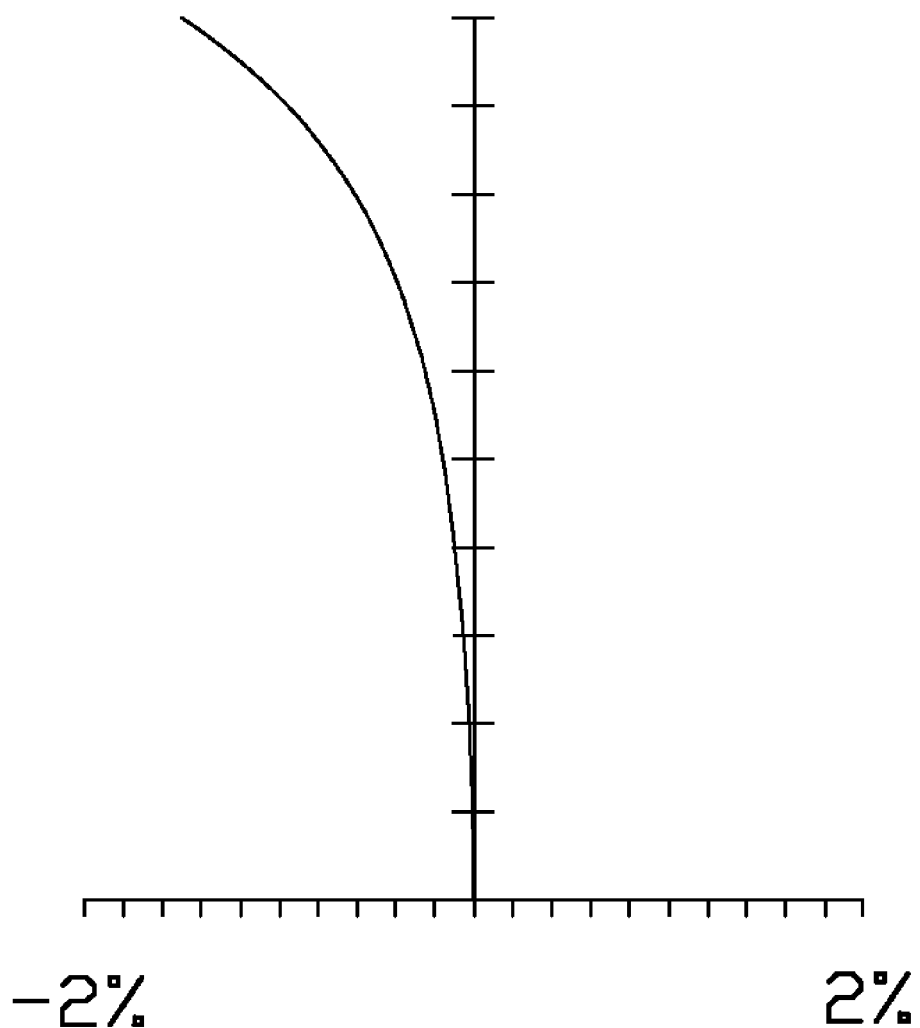

As illustrated in FIG. 5, spherical aberration occurring in projection lens 100 of Example 2 is limited to a range of: −0.1 mm~0.1 mm. As shown in FIG. 6, field curvature occurring in the projection lens 100 of Example 2 is limited to a range of: −0.1 mm~0.1 mm. In FIG. 7, distortion occurring in the projection lens 100 of Example 2 is limited to be within the range of: −2%~2%.

EXAMPLE 3

Tables 5, 6 show the lens data of EXAMPLE 3, wherein F=21.2 mm; F1=−47 mm; F2=31.02 mm; $F_{No}$=2.46; 2ω=55.57°, and the first lens 11 and the seventh lens 23 are aspherical lenses.

TABLE 5

| Surface | R (mm) | d (mm) | Nd | V |
|---|---|---|---|---|
| Magnification-side surface of the first lens 11 | 58.051 | 2.41 | 1.5247 | 56.26 |
| Minification-side surface of the first lens 11 | 11.667 | 2.202 | — | — |
| Magnification-side surface of the second lens 12 | 21.439 | 3.004 | 1.806 | 33.2694 |
| Minification-side surface of the second lens 12 | 103.82 | 2.701 | — | — |
| Magnification-side surface of the third lens 13 | −21.595 | 1.501 | 1.6175 | 48.0786 |
| Minification-side surface of the third lens 13 | 20.408 | 2.524 | — | — |
| Magnification-side surface of the fourth lens 14 | 30.179 | 3.302 | 1.6742 | 51.7521 |
| Minification-side surface of the fourth lens 14 | −51.502 | 6.5 | — | — |
| Magnification-side surface of the fifth lens 21 | 41.495 | 2.383 | 1.6987 | 48.9334 |
| Minification-side surface of the fifth lens 21 | −40.266 | 0.918 | — | — |
| Surface of aperture stop 95 | infinite | 11.36 | — | — |
| Magnification-side surface of the sixth lens 22 | −19.698 | 1.5 | 1.8467 | 23.78 |
| Minification-side surface of the sixth lens 22 | 73.743 | 1.214 | — | — |
| Magnification-side surface of the seventh lens 23 | 153.785 | 10 | 1.5247 | 56.26 |
| Minification-side surface of the seventh lens 23 | −20.171 | 0.2 | — | — |
| Magnification-side surface of the eighth lens 24 | 47.879 | 7.871 | 1.6178 | 60.4578 |
| Minification-side surface of the eighth lens 24 | −34.109 | 2 | — | — |
| Magnification-side surface of the PBS prism 96 | infinite | 22 | 1.6477 | 33.8482 |
| Minification-side surface of the PBS prism 96 | infinite | 1 | — | — |
| Magnification-side surface of the half-wave plate 97 | infinite | 0.7 | 1.5184 | 61.7 |
| Minification-side surface of the half-wave plate 97 | infinite | 1 | — | — |
| Magnification-side surface of the polarizer 98 | infinite | 0.7 | 1.523 | 58.57 |
| Minification-side surface of the polarizer 98 | infinite | 8.012 | — | — |
| The surface 99 | infinite | — | — | — |

TABLE 6

| Surface | Aspherical coefficient |
|---|---|
| Magnification-side surface of the first lens 11 | k = 2.9896; A4 = 1.42E−5; A6 = −8.47E−8; A8 = 3.87E−10; A10 = 7.12E−13 |
| Minification-side surface of the first lens 11 | k = −0.8105889; A4 = 2.33E−5; A6 = −5.69E−9; A8 = −1.99E−9; A10 = 2.06E−11 |
| Magnification-side surface of the seventh lens 23 | k = −748.1059; A4 = 2.68E−5; A6 = −1.04E−7; A8 = 1.76E−09; A10 = −4.39E−12 |
| Minification-side surface of the seventh lens 23 | k = −0.4196788; A4 = 1.26E−5; A6 = 9.62E−8; A8 = −1.61E−10; A10 = 3.23E−12 |

Figure 8:
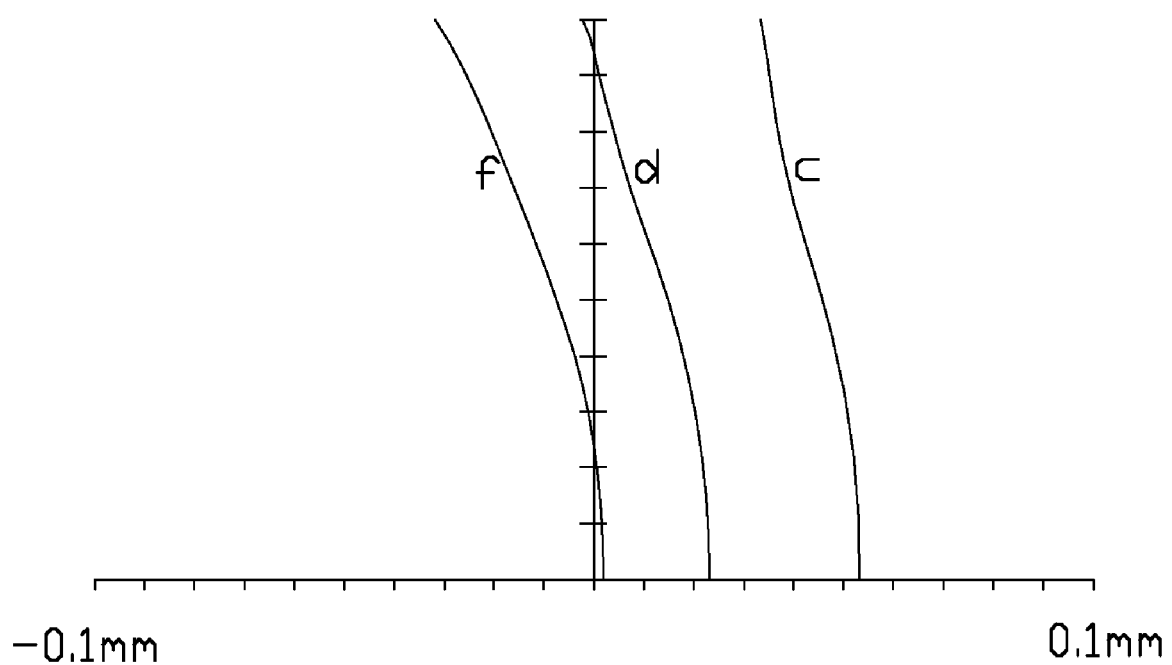
FIG. 8-10 are graphs respectively showing spherical aberration, field curvature, and distortion occurring in the projection lens in accordance with a third exemplary embodiment.
Figure 9:
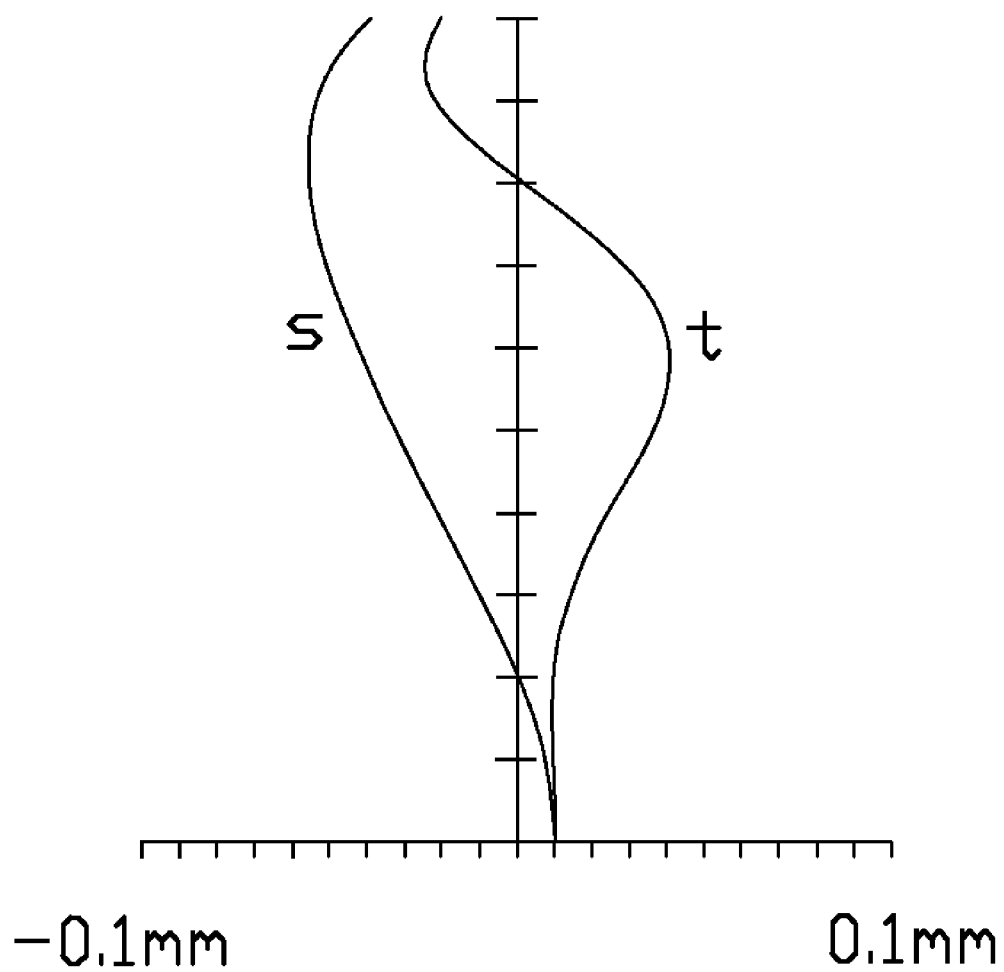
Figure 10:
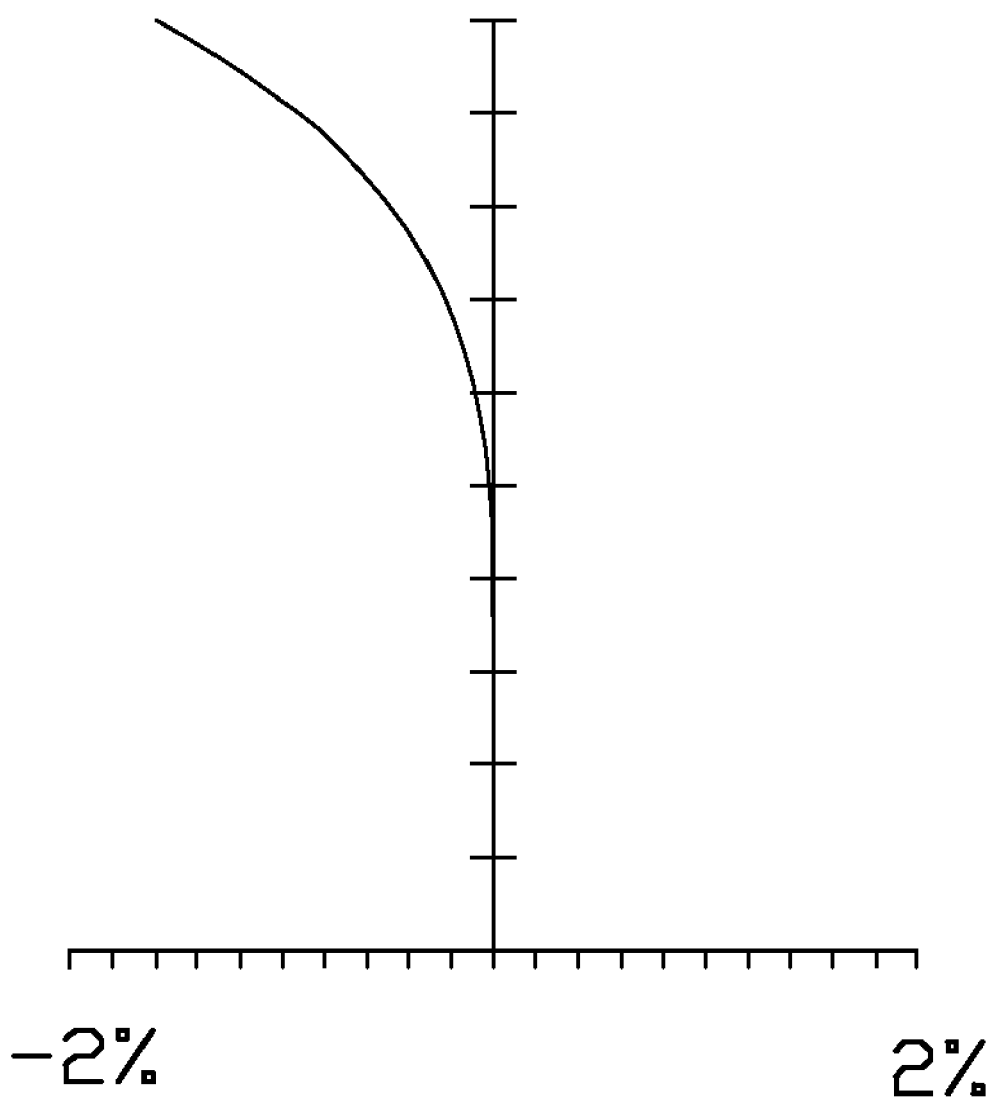

As illustrated in FIG. 8, spherical aberration occurring in projection lens 100 of Example 3 is limited to a range of: −0.1 mm~0.1 mm. As shown in FIG. 9, field curvature occurring in the projection lens 100 of Example 3 is limited to a range of: −0.1 mm~0.1 mm. In FIG. 10, distortion occurring in the projection lens 100 of Example 3 is limited to be within the range of: −2%~2%.

In all, in Examples 1~3, though the overall length of the projection lens 100 is reduced, the resolution of the projection lens 200 is maintained, even improved, since aberrations occurring in the projection lens 100 are controlled to be in an acceptable range.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. An projection lens comprising, in this order from the magnification side to the minification side thereof, a negative lens group having negative refraction power, and a positive lens group having positive refraction power, wherein the projection lens satisfies the formulas of: −2.5<F1/F<−1.5; and 1.3<F2/F<1.5, where F1, F2, and F respectively represent the effective focal lengths of the negative lens group, the positive lens group, and the projection lens, wherein the negative lens group comprises, in order from the magnification side to the minification side of the projection lens, a first lens of negative refraction power, a positive lens of positive refraction power, a third lens of negative refraction power, and a fourth lens of positive refraction power.

2. The projection lens as claimed in claim 1, wherein the projection lens satisfies the formula: $Lb/F>1.6$, where $Lb$ is the rear focal length of the projection lens.

3. The projection lens as claimed in claim 1, wherein the negative lens group comprises at least one aspherical lens.

4. The projection lens as claimed in claim 1, wherein the negative lens group comprises at least one lens satisfying the formula: $V>55$, and $n>1.5$, where $V$ is the Abbe number of the at least one lens, and $n$ is the refractive index of the at least one lens.

5. The projection lens as claimed in claim 1, wherein the positive lens group comprises at least one aspherical lens.

6. The projection lens as claimed in claim 1, wherein the positive lens group comprises at least one lens satisfying the formula: $V>60$, where $V$ is the Abbe number of the at least one lens.

7. An projection lens comprising, in this order from the magnification side to the minification side thereof, a negative lens group having negative fraction power, and a positive lens group having positive fraction power, wherein the projection lens satisfies the formulas of: $-2.5<F1/F<-1.5$, $1.3<F2/F<1.5$, and $0.24<D12/F<0.5$ where $F1$, $F2$, and $F$ respectively represent the effective focal lengths of the negative lens group, the positive lens group, and the projection lens, and $D12$ is the distance between the negative lens group and the positive lens group on the optical axis of the projection lens.

8. The projection lens as claimed in claim 7, wherein the projection lens satisfies the formula: $Lb/F>1.6$, where $Lb$ is the rear focal length of the projection lens.

9. The projection lens as claimed in claim 7, wherein the negative lens group comprises, in this order from the magnification side to the minification side of the projection lens, a first lens of negative refraction power, a positive lens of positive refraction power, a third lens of negative refraction power, and a fourth lens of positive refraction power.

10. The projection lens as claimed in claim 7, wherein the negative lens group comprises at least one aspherical lens.

11. The projection lens as claimed in claim 7, wherein the negative lens group comprises at least one lens satisfying the formula: $V>55$, and $n>1.5$, where $V$ is the Abbe number of the at least one lens, and $n$ is the refractive index of the at least one lens.

12. The projection lens as claimed in claim 7, wherein the positive lens group comprises, in this order from the magnification side to the minification side of the projection lens, a first lens of positive refraction power, a second lens of negative refraction power, a third lens of positive refraction power, and a fourth lens of positive refraction power.

13. The projection lens as claimed in claim 12, further comprising an aperture stop, the aperture stop being interposed between the first lens and the second lens.

14. The projection lens as claimed in claim 7, wherein the positive lens group comprises at least one aspherical lens.

15. The projection lens as claimed in claim 7, wherein the positive lens group comprises at least one lens satisfying the formula: $V>60$, where $V$ is the Abbe number of the at least one lens.

16. A projection lens comprising, in this order from the magnification side to the minification side thereof,
   a negative lens group having negative fraction power, and
   a positive lens group having positive fraction power, comprising, in this order from the magnification side to the minification side of the projection lens,
      a first lens of positive refraction power,
      a second lens of negative refraction power,
      a third lens of positive refraction power, and
      a fourth lens of positive refraction power;
   wherein the projection lens satisfies the formulas of: $-2.5<F1/F<-1.5$; and $1.3<F2/F<1.5$, where $F1$, $F2$, and $F$ respectively represent the effective focal lengths of the negative lens group, the positive lens group, and the projection lens.

17. The projection lens as claimed in claim 13, further comprising an aperture stop, the aperture stop being interposed between the first lens and the second lens.

* * * * *